(No Model.)
J. A. FREY.
REFRIGERATOR WAGON.
No. 308,151. Patented Nov. 18, 1884.
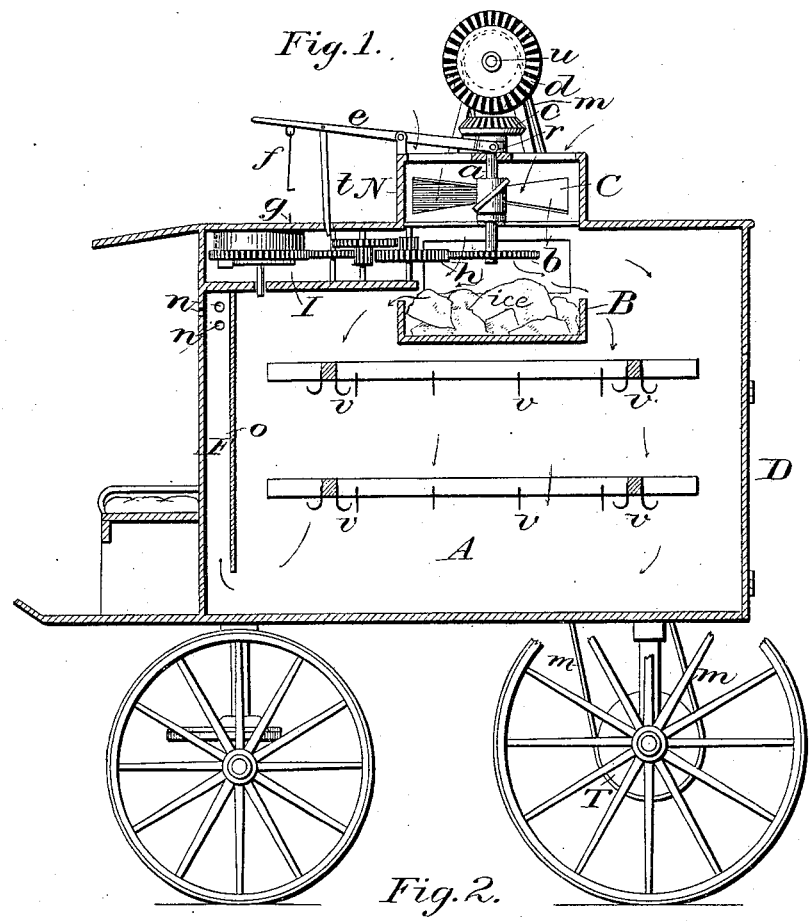
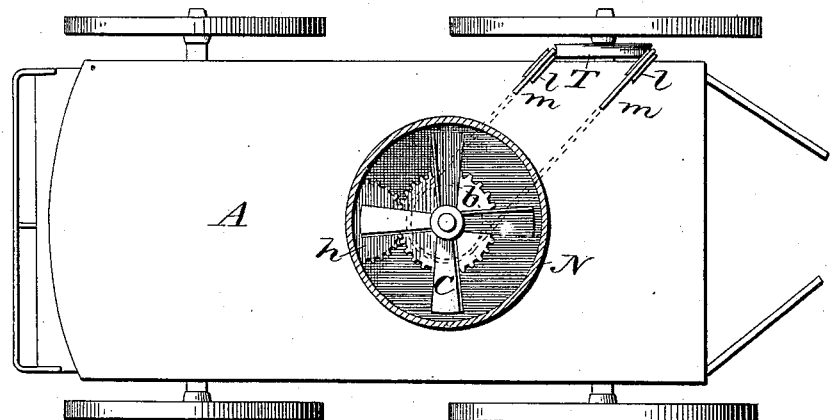
Witnesses:
Jas. F. DuHamel
Walter S. Dodge
Inventor:
John A. Frey
by Dodger Son.
Attys.

UNITED STATES PATENT OFFICE.

JOHN A. FREY, OF COLESVILLE, MARYLAND.

REFRIGERATOR-WAGON.

SPECIFICATION forming part of Letters Patent No. 308,151, dated November 18, 1884.

Application filed April 8, 1884. (No model.)

*To all whom it may concern:*

Be it known that I, JOHN A. FREY, of Colesville, in the county of Montgomery and State of Maryland, have invented certain Improvements in Refrigerator-Wagons, of which the following is a specification.

My invention relates to vehicles for the use of butchers or parties who supply families with fresh meat; and the invention consists, primarily, in combining with the wagon a fan so arranged that it can be operated by the vehicle or wagon when the latter is moving, and by clock-work when the wagon is stationary.

It further consists in combining therewith a receptacle for ice to cool the air forced in by the fan, and various other details hereinafter more fully set forth.

Figure 1 is a longitudinal vertical section of a wagon embodying my invention, and Fig. 2 is a top plan view of the same.

This improvement is specially designed for the use of butchers who supply fresh meat to families and others residing in small villages and country places, where it is not usual to have markets as in cities, and who usually distribute the meat to their customers by going from house to house. It is customary in such cases for the butcher doing a limited business of this kind, to slaughter a beef animal, and perhaps a sheep or two, the evening previous to distributing the meat during the morning and forenoon of the day following; and as these parties are not provided with the large refrigerators and cooling-chambers now generally provided for the larger dealers in cities, it is impossible for them to preserve and furnish the meat to their customers in the best condition.

As is well understood by those familiar with the business, it is desirable to get the natural or animal heat out of the carcass as soon as possible after the animal is slaughtered, and it is also desirable to keep the meat cool and free from the attacks of flies and other insects until delivered. With the appliances now used by village or country dealers, it is very difficult to accomplish these desirable results, and it is to accomplish these results that my invention is designed. To do this I construct a wagon with a box or body, A, that can be closed nearly air-tight, except at the points where the air is to be forced in and out, as hereinafter described, and at the top, within a casing, N, mount a fan, C, arranged to force a current of air into the same when rotated. This fan may be driven in any suitable or convenient manner by belt or gearing, or both, connecting it with one of the wheels of the wagon. A simple manner of doing this is shown in Fig. 1, in which a pulley, T, is shown connected to the inside of one of the hind wheels, and from which a cord or small chain passes up to a corresponding pulley (indicated by dotted line) on the outer end of a horizontal shaft, $u$, mounted in a support, $p$, on the top of the box A. At its inner end this shaft $u$ is provided with a bevel gear-wheel, $d$, which, when the fan-shaft is elevated, engages with a corresponding bevel-wheel, $c$, and thus, whenever the wagon is being drawn along, motion is imparted to the fan, which will force a current of air into the box A at the top, as indicated by the arrows.

If preferred, the gear-wheels $b\ c$ may be dispensed with and the cord or chain $m$ be run direct to a pulley on the fan-shaft by suitably arranging guide-pulleys $l$ at the upper corner of the box A, as shown in Fig. 2. It will of course be understood that these guide-pulleys may be located so as to carry the cord to a pulley on the fan-shaft, in place of the gear-wheel $c$, as indicated in Fig. 2; or that they may be so located as to carry the cord through inside of the box, and along under its roof, to a pulley on the shaft just above the gear-wheel $b$, (shown in Fig. 2,) it not being designed to limit the arrangement of these operating devices to any special plan or arrangement, but simply to show herein a simple and efficient means of driving the fan by the motion of the vehicle. So, too, in practice sprocket-wheels and chains will probably be found preferable to grooved pulleys and cords, because of the liability of the latter to be affected by rain and mud; but as these are matters well understood by mechanics, it is unnecessary to give further details in that respect.

In order to operate the fan when the wagon is not in motion, I provide a suitable spring-motor in the nature of a clock mechanism, as shown at I, Fig. 1, and so locate it as that the last wheel, *h*, of the train will engage with a wheel, *b*, on the lower end of the fan-shaft, as shown in Fig. 1, thereby imparting motion to the fan. As this is only designed to operate the fan when it is not driven by the motion of the vehicle, it is necessary to so arrange the parts that when the fan is to be operated by either of these motors it can be thrown out of connection with the other. This may be done in various ways; but one of the simplest is to so arrange the fan-shaft that it can be raised or lowered at will, as shown in Fig. 1, in which it is represented as lowered, thus bringing it into gear with the clock mechanism, while its gear-wheel *c* is thrown out of gear with the bevel-wheel *d*, operated by the movement of the wagon, as before described.

In order to move the fan-shaft so as to throw it in and out of gear with the two motors, as described, I place upon the fan-shaft a loose collar, *r*, Fig. 1, and pivot thereto the forked end of a lever, *e*, which is provided with a hook, *f*, arranged to hook into a staple, *g*, and thus hold the fan-shaft elevated. When the lever *e* is thus moved and secured in position, the fan-shaft will be raised, thereby throwing the wheel *c* into gear with the wheel *d*, at the same time raising the wheel *b* on the lower end of the shaft out of gear with the wheel *h* of the clock mechanism. When thus arranged, the fan will be driven by the movement of the vehicle. When the latter is stationary and it is desired to operate the fan, the hook *f* is disengaged from its staple *g* and the fan-shaft allowed to drop to the position shown in Fig. 1, in which case the wheel *c* will be disengaged from the wheel *d*, and the wheel *b* will be thrown into gear with the wheel *h* of the clock mechanism, which will then drive the fan.

In order to prevent the clock mechanism from continuing to run after the fan has been thrown out of gear with it, I pivot to the lever *e* a pendent rod, *t*, as shown in Fig. 1, the lower end of this rod being arranged to engage in one of the wheels of the clock mechanism as it is shoved down by depressing the lever *e*, and thus stop it. When the lever is raised again to throw the fan into gear with the clock mechanism, the rod *t* is also raised, thus releasing the clock mechanism from its locking effect, and permitting it to resume its motion to again operate the fan.

While the plan above described is a very simple and efficient one for accomplishing the desired end of throwing the fan in and out of gear with the two motors and of locking and releasing the clock mechanism, I do not desire to be understood as limiting my invention to the use of these specific means or devices, because there are numerous well-known mechanical equivalents which may be readily substituted by persons skilled in such matters. By these means the fan can be made to operate and impel a current of fresh air into the box A at any time desired, and whether the vehicle be moving or stationary.

In order to cool the air as it enters, in case it be desired, I arrange an ice-box, B, directly under the fan, or where the incoming current of air will impinge upon or pass over the ice, as shown in Fig. 1. The air thus cooled will naturally fall to the bottom because of its greater gravity; and to permit the escape of the warmer and lighter air, I provide at the front of the box A a partition, *o*, thus forming a space or flue, F, up which it may pass and escape through a series of holes, *o*, at or near the top. One or more of these flues F may be provided at the sides or in the corners, instead of at the front; or a series of holes may be made in the top at the front and rear ends without any partition or flue, the air in such case passing down at or near the center and up at the ends, and thence out; or the ice-receptacle may be located at the front and at or near the bottom, if preferred, in which case the air will be conducted to the ice, or be deflected from the fan upon it by suitably-arranged chutes or deflecting-boards, as may be found most convenient in practice. The box or body A will of course be provided with one or more doors, D, at its rear end, as indicated in Fig. 1, and also with hooks V, upon which to hang the pieces of meat.

It is obvious that the box A may be made with double walls, with or without filling, to more effectually protect the contents from the effect of the external heat; but as this is a matter well understood it need not be specifically described. If the walls be made double in whole or in part, they will serve for the escape of the warmed or vitiated air, instead of, or as illustrated, by the flue F, Fig. 1.

Whether ice be used or not the current of fresh air forced in by the fan will be of great benefit, as it will displace the air within the box, and which, when the meat is placed therein, will soon become saturated or loaded with the scent of the recently-prepared meat, and besides this current of air will drive away the flies or insects, and thus be of great benefit in that respect also.

The manner of using this improved wagon will be readily understood; but I will state that the intention is as soon as the animal is slaughtered at evening to cut up the carcass and place it in the box, hanging the pieces upon the hooks and on the bottom, separating them so that the air can pass over and under them all freely, and then to start the fan by releasing the spring-motor, which will force a current of fresh cool air through the box, and thus remove the natural or animal heat in the shortest possible time.

By a suitable arrangement of gearing the fan may be made to operate during the entire night, and, if desired, additional motive power may be applied by means of weights and pulleys fixed to a frame or in the building in which the wagon is placed during the night, if it be placed in one for security, the arrangement of weights and pulleys being similar to that used with the well-known carbureters, and which, therefore, need not be further described.

When driving about to deliver the meat to customers on the following morning, the driver will throw the fan into gear with the driving-pulley of the vehicle, and thus operate it while traveling, the clock mechanism being locked so as not to run, and when he stops, by a movement of the lever e, he can throw the fan into gear with the clock mechanism, which will then operate the fan until ready to start again, when the clock mechanism will be stopped and the fan again thrown into gear with the driving-wheel of the vehicle.

I am aware that cars have been patented with a fan driven from the axle, also that a car has been described as having a pump operated from the axle to force air into a cooling-apartment, and provided with an electro-motor to operate an independent fan when the car was stationary, and also that a car has been patented in which there are shown air-compressors to force air into tanks, such compressed air then being used to operate a gas-condensing pump located in a refrigerating compartment in said car with a fan to cause a circulation of the air within the car, and I do not claim any of these; but,

Having thus described my invention, what I claim is—

1. In combination with a wagon or vehicle substantially such as described, a fan arranged to be operated by the movement of the wagon or vehicle or by an independent motor when the vehicle is stationary, substantially as and for the purpose set forth.

2. A wagon or vehicle provided with a box, A, having a fan mounted thereon with suitable mechanism for imparting motion to the fan by the movement of the vehicle, in combination with a clock mechanism, I, or an equivalent independent motor for operating the fan when the vehicle is stationary, substantially as herein described.

3. In combination with a wagon, substantially such as described, and provided with mechanism for imparting motion to a fan mounted thereon, an independent motor for operating the fan when the wagon or vehicle is stationary, and means, substantially such as described, whereby the fan may be thrown into or out of connection with the driving mechanism of the wagon or the independent motor, and the latter simultaneously started or stopped at will, as and for the purpose set forth.

4. In combination with a wagon provided with a fan and mechanism for imparting motion to the fan by the movement of the wagon, the independent motor or clock mechanism I, the adjustable fan-shaft a, and lever e, for operating the same, substantially as shown and described.

5. In combination with a wagon having a fan mounted thereon and arranged to be operated either by the motion of the wagon or by an independent motor, the receptacle B, for ice arranged to receive the impelled current of air as it enters the box, substantially as described.

6. In combination with the adjustable fan-shaft arranged to be operated by either of the two motors, the shifting-lever e, and the stop-bar t, or equivalent means for stopping and releasing the independent motor I, all arranged to operate substantially as and for the purpose set forth.

JOHN A. FREY.

Witnesses:
WALTER S. DODGE,
W. C. DODGE.